UNITED STATES PATENT OFFICE.

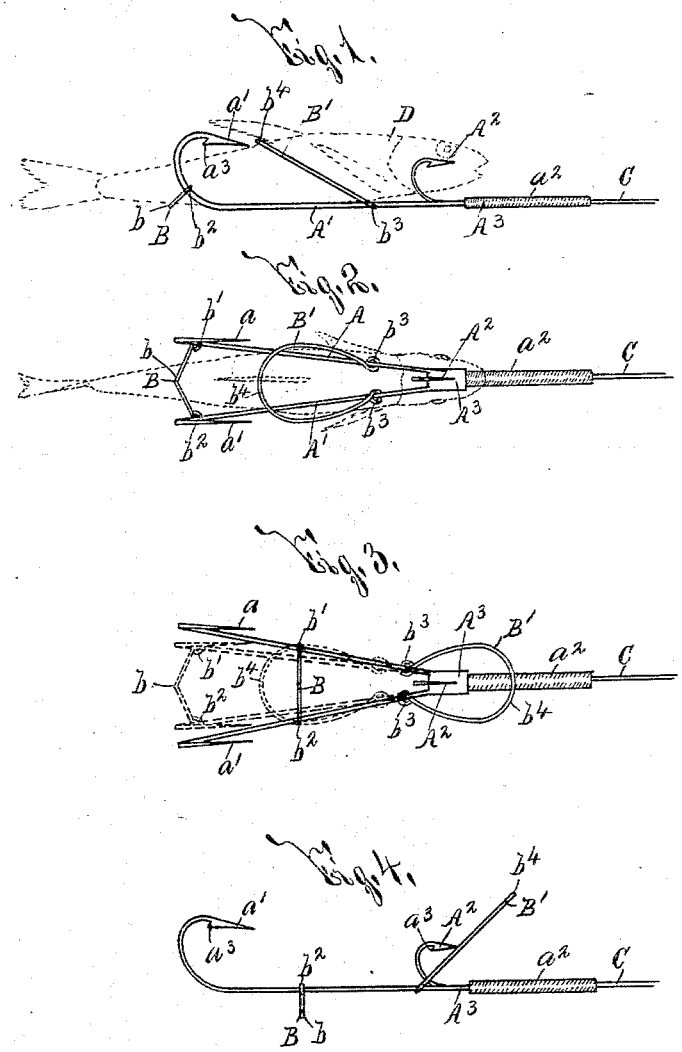

DAVID M. KITTLE, OF CANAJOHARIE, NEW YORK.

FISH-HOOK.

SPECIFICATION forming part of Letters Patent No. 533,652, dated February 5, 1895.

Application filed April 4, 1894. Serial No. 506,276. (No model.)

*To all whom it may concern:*

Be it known that I, DAVID M. KITTLE, of Canajoharie, in the county of Montgomery, in the State of New York, have invented new and useful Improvements in Hooks, of which the following, taken in connection with the accompanying drawings, is a full, clear, and exact description.

My invention relates to improvements in fishing hooks, and has for its object the production of a simple device, which practically supports the bait, prevents its undue removal and firmly and effectively engages the fish; and to this end it consists, essentially, in separated movable shanks, each provided with a hook, and a cross bar movable lengthwise of said shanks for engaging the bait, and moving the free extremities of the shanks toward and away from each other.

The invention also consists in a second cross bar supported by the shanks and having its intermediate portion arranged above the corresponding portion of the former cross bar, and in the general construction and arrangement of the component parts.

In describing this invention, reference is had to the accompanying drawings, forming a part of this specification, in which like letters indicate corresponding parts in all the views.

Figures 1 and 2 are, respectively, side elevation and top plan view of the preferable form of my improved fishing hook, a minnow being indicated by dotted lines as operatively engaged thereby, and the cross bar for moving the shanks of the hook toward and away from each other being indicated in proximity to the free extremities of said shanks; and Figs. 3 and 4 are, respectively, top plan view and side elevation of my improved fishing hook, the cross bar for moving the shanks of the hook toward and away from each other being indicated as engaged with the central portions of said shanks, the second cross bar being indicated as moved forward to its position assumed when the bait is engaged with the hook, and the fishing hook being shown by dotted lines at Fig. 3 in its position assumed when the bait is operatively engaged thereby.

It is well known that considerable difficulty is experienced in practically supporting minnows, crabs, frogs, &c., when fishing, and that fish sometimes remove the same without engaging the hook, or else are so ineffectively engaged that they readily escape. My invention is designed to obviate this undesirable result.

My improved fishing hook consists, essentially, of two separated shanks A A' each provided with a hook $a\,a'$, an additional hook $A^2$ for engaging the bait, and cross bars B B' for also engaging the bait, one of said cross bars operating to move the shanks toward and away from each other. The shanks A A', although here illustrated as of substantially the same length, may be formed of unequal length, and they are preferably more or less flexible and are inclined from each other toward their free extremities, which are provided with hooks $a\,a'$. Their opposite extremities are fixed or secured to a head $A^3$ provided with an engaging end $a^2$ to which a snell or line C is suitably secured.

The head $A^3$ is preferably soldered to the shanks A A' which are usually formed separable from each other, but may evidently be formed of a single piece of wire or other material bent to the desired form.

The hooks $a\,a'$ are of any suitable form, and are here illustrated as slightly outturned, and as provided with barbs $a^3$, and, as the shanks A A' are moved toward and away from each other, the hooks $a\,a'$ or approximated or separated.

The additional hook $A^2$ for engaging the bait is suitably secured to the head $A^3$, and, in order to clearly illustrate its operation, I have indicated a minnow D by dotted lines at Figs. 1 and 2 as operatively engaged with my improved hook. Any suitable portion of the minnow, as its head, may be engaged with the hook $A^2$, and the cross bars B B' immediately described, hold the minnow in its designed position, with an opposite portion as its tail interposed between the hooks $a\,a'$.

The cross bar B, in addition to engaging the bait, operates to move the shanks A A' toward and away from each other, and, as preferably constructed, it consists of a flexible strip or piece of wire having an outturned intermediate portion $b$ and opposite eyes $b'\,b^2$ engaged with the shanks A A' and movable lengthwise thereof. When arranged in proximity to the free extremities of the shanks A A' the cross bar B holds the hooks $a\,a'$ in close proximity to the adjacent sides of the bait and its intermediate portion is formed with a substantially smooth face which engages the under side of the bait, as clearly illustrated at Figs. 1 and 2 and by dotted lines in Fig. 3; and, when said bar B is engaged with the intermediate portions of the shanks A A', the hooks $a\,a'$ are separated as seen by full lines at Fig. 3 to permit ready securement of the bait. The cross bar B' is also preferably formed of a flexible strip or piece of wire for permitting of its ready adjustment lengthwise of the shanks A A' and is provided with eyes $b^3\,b^3$ movable lengthwise of said shanks. The intermediate portion $b^4$ of the cross bar B' which is bent into the form of a loop, is passed over the minnow and is formed with a substantially smooth face engaged therewith directly back of its dorsal pin.

In placing the minnow in position the cross bar B is engaged with the intermedate portions of the shanks A A' and the cross bar B' is swung or moved forwardly, so as to permit ready engagement of the head of the minnow with the hook $A^2$, and said cross bars are then forced to their position illustrated at Figs. 1 and 2. The minnow is thus readily engaged with my improved hook, and, although free to move, is practically and effectively held in position, and, whenever a fish strikes at the minnow or endeavors to feed upon the same, its engagement with one of the hooks $a\,a'$ is practically certain, and such engagment is evidently effectual and sufficient to permit landing of the fish if ordinary care is exercised.

Instead of the cross bar B' I sometimes use an additional cross bar of substantially the same form as the bar B, but of slightly greater length, and arrange this additional cross bar, which it is unnecessary to illustrate, nearer the hooks $a\,a'$ than the cross bar B, and consequently the intermediate portion of said cross bar is above the corresponding portion of the bar B. The bait is then interposed between the two corresponding cross bars, which are moved along the shanks A A' until engaged with the upper and lower sides of the bait.

It is evident to one skilled in the art that crabs and small frogs may also be engaged with my improved hook when desired to use the same instead of a minnow. When a crab is used its tail portion is engaged with the hook $A^2$ and its front or head portion is interposed between the cross bars B B', and, when a frog is used, its head portion is engaged with the hook $A^2$, its under side by the cross bar B, and the upper portions of its haunches by the cross bar B'.

The operation of my invention will be readily perceived from the foregoing description and upon reference to the accompanying drawings, and it will be readily apparent that the same is simple in construction, practically supports the bait, prevents its undue removal, and firmly and effectually engages the fish.

As the exact detail construction and arrangement of my invention may be somewhat varied I do not herein specifically limit myself to such exact detail construction and arrangement.

Having thus fully described my invention, what I claim as new, and desire to secure by Letters Patent, is—

1. A fishing hook comprising separated shanks each provided with a hook, a cross bar secured to the shanks for engaging the under surface of the bait, and a second cross bar secured to said shanks for engaging the upper surface of the bait, substantially as and for the purpose described.

2. A fishing hook comprising separated movable shanks each provided with a hook, a cross bar movable lengthwise of the shanks for engaging the under surface of the bait, and a second flexible cross bar secured to said shanks for engaging the upper surface of the bait, substantially as and for the purpose specified.

3. A fishing hook comprising separated movable shanks each provided with a hook, a flexible cross bar for engaging the under surface of the bait, and a second cross bar movable lengthwise of the shanks for engaging the upper surface of the bait, substantially as set forth.

4. A fishing hook comprising separated shanks each provided with a hook, a cross bar secured to the shanks and having its intermediate portion deflected outwardly beyond said shanks for engaging the under surface of the bait, and a second cross bar secured to the shanks and having its intermediate portion deflected outwardly beyond said shanks and arranged normally above the former cross bar for engaging the upper surface of the bait, substantially as and for the purpose specified.

5. A fishing hook comprising separated flexible shanks each provided with a hook, a flexible cross bar movable lengthwise of the shanks for engaging the under surface of the bait, and a second flexible cross bar movable lengthwise of the shanks for engaging the upper surface of the bait, substantially as described.

In testimony whereof I have hereunto signed my name, in the presence of two attesting witnesses, at Syracuse, in the county of Onondaga, in the State of New York, this 31st day of March, 1894.

DAVID M. KITTLE.

Witnesses:
CLARK H. NORTON,
E. A. WEISBURG.